(12) United States Patent
Mayer et al.

(10) Patent No.: US 6,502,824 B2
(45) Date of Patent: Jan. 7, 2003

(54) BRUSH SEAL FOR A BEARING CAVITY

(75) Inventors: Robert Russell Mayer, Schenectady, NY (US); Mahmut Faruk Aksit, Troy, NY (US); Bharat Sampathkumaran Bagepalli, Niskayuna, NY (US)

(73) Assignee: General Electric Company, Schenectady, NY (US)

( * ) Notice: Subject to any disclaimer, the term of this patent is extended or adjusted under 35 U.S.C. 154(b) by 96 days.

(21) Appl. No.: 09/738,384

(22) Filed: Dec. 15, 2000

(65) Prior Publication Data
US 2002/0074730 A1 Jun. 20, 2002

(51) Int. Cl.[7] ............................................. F16J 15/44
(52) U.S. Cl. ........................................................ 277/355
(58) Field of Search .......................................... 277/355

(56) References Cited
U.S. PATENT DOCUMENTS

| | | | |
|---|---|---|---|
| 4,497,172 A | * | 2/1985 | Smith |
| 4,600,202 A | * | 7/1986 | Schaeffler et al. |
| 5,400,586 A | | 3/1995 | Bagepalli et al. |
| 5,425,543 A | * | 6/1995 | Buckshaw et al. |
| 5,474,305 A | * | 12/1995 | Flower |
| 5,749,584 A | | 5/1998 | Skinner et al. |
| 5,971,400 A | | 10/1999 | Turnquist et al. |

FOREIGN PATENT DOCUMENTS

GB 2 301 635 A 12/1996

* cited by examiner

Primary Examiner—Anthony Knight
Assistant Examiner—Alison K. Pickard
(74) Attorney, Agent, or Firm—Nixon & Vanderhye

(57) ABSTRACT

A rotatable shaft is mounted in an oil bearing and generates oil mist. One or more brush seals are carried by the bearing housing for substantially sealing the oil mist in the bearing cavity from migration outwardly. The bristles have a diameter in the range of 0.5 to 1.0 mils, preferably about 0.56 mils. The bristles have a stiffness less than 1 psi/mil and preferably about 0.2 psi/mil. The brush seal is mounted on a sheet metal mounting plate, enabling an inexpensive securement of brush seals to the housing.

9 Claims, 2 Drawing Sheets

BRUSH SEAL FOR A BEARING CAVITY

BACKGROUND OF THE INVENTION

The present invention relates to brush seals for preventing oil mist generated in a bearing cavity from passing outwardly of the bearing cavity and particularly relates to brush seals having highly flexible, densely packed bristles for engaging a rotary component for effectively maintaining the oil mist within the bearing cavity.

Rotating machinery generally includes a first rotary component such as a shaft rotatable relative to a fixed component, e.g., a housing. The shaft is typically rotatable in one or more bearings fixed to the housing. The bearings include a bearing cavity and generally include an oil film. The rotary movement of the shaft within the bearing cavity generates an oil mist which must be prevented from leaving the bearing cavity. Otherwise, the oil mist may settle on other parts of the rotary machine which may cause damage to the machine. Also, oil mist flowing from the bearing cavity may settle out in the surrounding environment, causing a safety hazard and, of course, an unpleasant aesthetic condition.

In many rotary machines, simple tight clearance seals, where the stationary component fits tightly about the rotating component, are sufficient to prevent the oil mist from migrating from the bearing cavity. However, in certain applications, large rotor radial excursions may occur. Consequently, the tightness of the clearance seals is a function of the radial excursion of the rotor. To accommodate such excursions, adequate spacing between the rotary and fixed components at the seal is necessary, oftentimes leaving sufficient clearance for the oil mist to flow or migrate from the bearing cavity through the clearance opening. Another seal commonly used to contain oil is a labyrinth seal. A labyrinth seal comprises a plurality of axially spaced teeth projecting essentially radially from the fixed component, the teeth being either machined or added as inserts into the fixed component. Because these teeth have a relatively small axial dimension and generally are formed of softer material than the rotating component, damage to the rotating component is unlikely in the event of a radial excursion. It will be appreciated that the tortuous path between the rotary component and the teeth of the labyrinth seal creates a seal at least as effective as a simple clearance seal. However, in the event of large or significant radial excursions, the labyrinth seal teeth are damaged and, once damaged, irreversibly provide for an increase in leakage flow over the remaining useful life of the seal. Further, in most implementations of labyrinth seals, the seal involves a large complex casting requiring a significant amount of machining to form the seals. Also, the mass of these labyrinth seals can be extensive, rendering assembly difficult. Accordingly, there is a need for an effective, low-cost seal for sealing a bearing cavity to prevent or minimize leakage of oil mist and which seal avoids machining complexity typical of seals employed for a similar purpose.

BRIEF SUMMARY OF THE INVENTION

In accordance with a preferred embodiment of the present invention, there is provided a rotary machine having a rotatable component such as a rotor and a fixed component such as a housing having an oil bearing including an oil bearing cavity. The oil in the cavity generates an oil mist which is sealed in the cavity on one or both sides of the rotary component by a brush seal. The brush seal may comprise the sole seal for sealing the bearing cavity or it may comprise a brush seal in combination with one or more labyrinth seal teeth or with another brush seal. Each brush seal includes a backing from which projects a plurality of brush seals, the tips of which lie in engagement with the rotary component. Because the sealing environment for preventing oil mist from migrating from a bearing cavity is a low pressure environment, i.e., a nominal or minimum pressure differential across the seal, the bristles of the seal may be formed of a very flexible material to accommodate radial excursions of the rotary component. Additionally, the cant angle of the bristles, i.e., the angle of the bristles relative to a radius, may be small as compared with conventional brush seals, i.e., on the order of about 5–10°. The bristles are preferably formed of a polymer material.

In a preferred form of the present invention, the brush seal is mounted on a sheet metal backing plate which can be affixed to the fixed component. For example, two arcuate sheet metal plates, each extending approximately 180°, carry the backing plates confining the bristles of the brush seal along a radial innermost edge. The sheet metal support is simply bolted to the housing. By forming the brush seal support of sheet metal, the construction is much lighter, does not require extensive machining, and simplifies installation yet retains all of the benefits of a brush seal. Additionally, with this type of construction, the brush seal can be applied as a retrofit onto existing seals. For example, one or more labyrinth seal teeth can be removed from existing seals and replaced by the brush seal in a low-cost manner. It will be appreciated that a brush seal of this type may be used in virtually all the forms of rotating machinery, including gas turbines, steam turbines, compressors, motors and the like, where a seal for an oil bearing cavity is necessary. It will also be appreciated that because of the low pressure differential across the seal, the brush bristles can be formed to a much smaller diameter than the diameter of conventional brush seal bristles and, consequently, a highly dense packing of the bristles can be provided.

In a preferred embodiment according to the present invention, there is provided a rotary machine comprising a rotatable component, a component fixed against rotation including a housing having a wall and a bearing in a bearing cavity on one side of the wall, the bearing cavity containing an oil mist generated by the rotation of the rotatable component in the bearing cavity, a seal between the rotatable component and housing wall for substantially sealing the oil mist in the bearing cavity from migration outwardly of the bearing cavity past the wall, the seal including a brush seal carried by the housing wall and having flexible bristles engaging the rotatable component, a backing plate for supporting the bristles and a sheet metal mounting plate carrying the backing plate for securement to the housing wall.

DETAILED DESCRIPTION OF THE INVENTION

Figure 1:
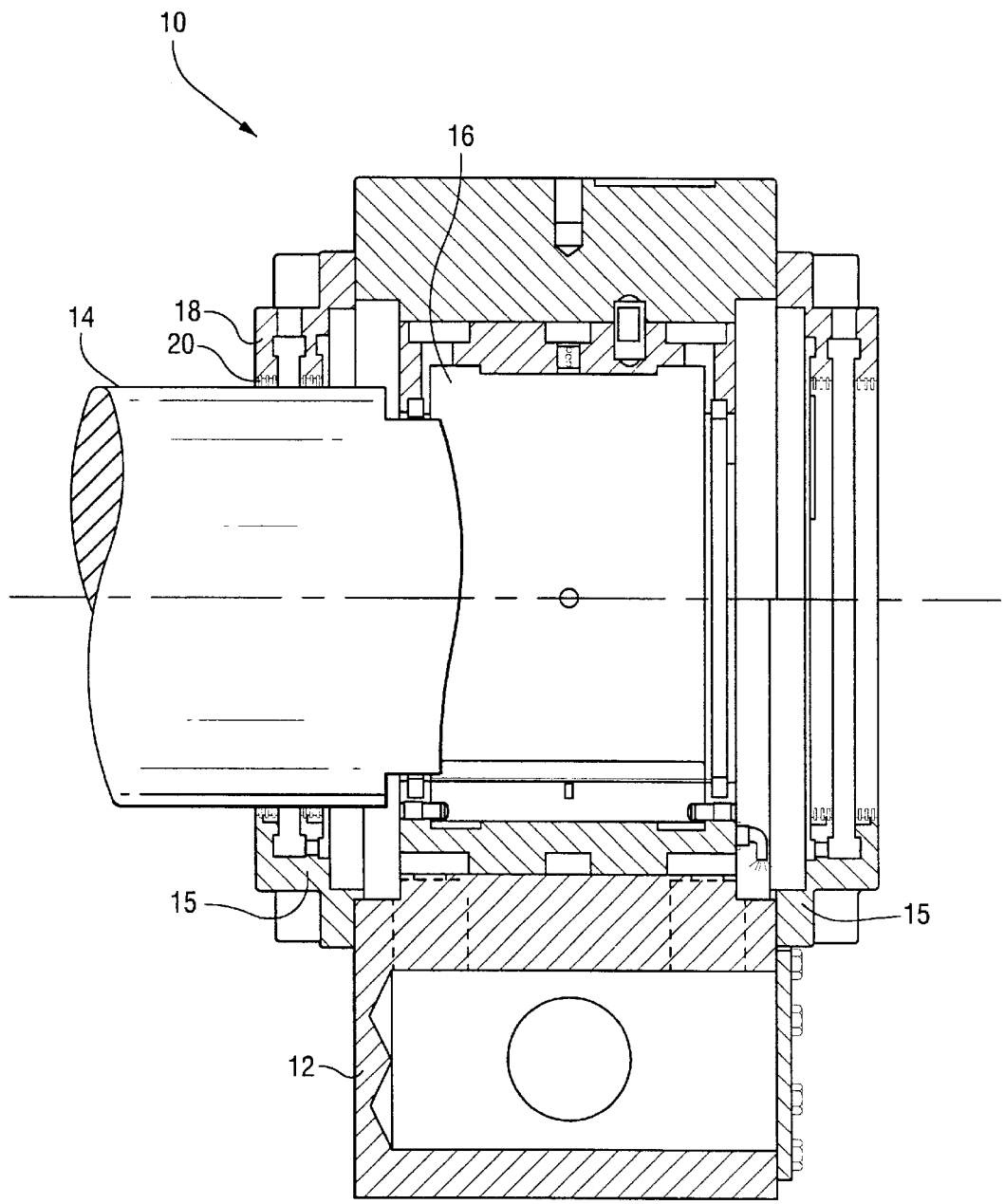
FIG. 1 is a cross-sectional view of a bearing including a prior art bearing cavity and shaft with labyrinth seals on opposite sides of the bearing.

Referring now to the drawings, particularly to FIG. 1, there is illustrated a bearing, generally designated 10, having a fixed bearing pedestal 12 forming part of a fixed component of a rotary machine having a rotatable component or shaft 14 extending through opposite walls 15 of the bearing cavity 16. The bearing cavity 16 typically contains oil which, by rotation of the rotor 14, generates an oil mist. To prevent leakage of the oil mist from the oil bearing cavity, a pair of seals 18 are provided at each of the opposite sides of the bearing cavity. As illustrated in FIG. 1, seals 18 comprise a series of labyrinth teeth 20. Where shafts have substantial radial excursions, the labyrinth seals requires substantial clearance, permitting leakage of the oil mist from the oil bearing cavity. Also over time, and in the event of large radial excursions, the teeth of the labyrinth seals are flattened irreversibly, increasing their clearance with the shaft and hence have diminished remaining sealing capacity.

Figure 2:
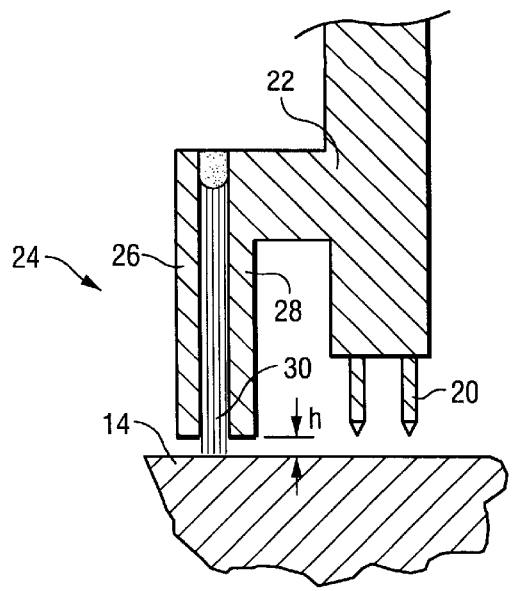
FIG. 2 is an enlarged cross-sectional view of a seal at either of the opposite ends of the bearing cavity.

In accordance with a preferred form of the present invention, one or more of the labyrinth seals 20 are replaced by a brush seal or the sealing is provided solely by brush seals. For example, as illustrated in FIG. 2, a pair of labyrinth seal teeth 20 are illustrated overlying the shaft 14 accompanied by a brush seal 24 axially spaced from the teeth 20. Labyrinth teeth oftentimes are machined as part of the seal mounting structure 22, may be removed by machining and replaced by a brush seal. In the illustrated form, the brush seal 24 includes a pair of backing plates 26 and 28 with bristles 30 disposed between the backing plates and projecting therefrom. While there are a number of different ways of securing the bristles 30 into the brush seal, typically the bristles are welded between the backing plates at the ends opposite the bristle tips which engage the rotary component 14. In the case of polymer bristles, as here, such as Kevlar®, the bristles may be secured by a heat-welding process or may be clamped between the backing plates 26 and 28. For example, the bristles may be folded about an annular or semi-annular wire with the backing plates clamped to one another, maintaining the bristles secured in the brush seal.

The backing plates 26 and 28 are preferably formed of a sacrificial material, such as aluminum, polyester or tin. In this manner, the inside diameter of the backing plates can be very close to the outside diameter of the shaft 14, i.e., the fence height h can be very low. Radial excursions of the shaft may cause contact between the shaft and the backing plates. However, with the backing plates formed of such sacrificial material, the effectiveness of the seal is not substantially affected.

The bristles preferably have a very fine diameter and are densely packed. By using a polymer bristle, e.g., Kevlar®, the cant angle of the bristles, i.e., the angle of the bristles relative to the radius of the rotary component, may be minimized to a range of approximately 0–10° and preferably approximately 5–10°, while accommodating radial excursions of the rotary component 14. It will be appreciated that even with the radial excursions, the tips of the bristles are maintained in engagement with the surface of the rotor 14.

Further, the stiffness of the bristles is preferably quite low. For example, conventional brush seals employ Kevlar® bristles having a stiffness on the order of 1–2 psi/mil. The stiffness of the bristles used in the present brush seal is on the order of 0.2–0.4 psi/mil and preferably at the lower end of the range, i.e., 0.2 psi/mil. contributing to the softness of the bristles, i.e., their flexibility, is the very small diameter of the bristles. Conventional brush seal bristles have a diameter on the order of 5–7 mils. The bristles hereof, however, have a diameter in a range of 0.5–1.0 mils and preferably about 0.56 mils. The lack of stiffness, i.e., the softness of the bristles is significant since it precludes or inhibits the tips of the bristles engaging the shaft from obtaining high temperatures which would carbonize or coke on the bristle tips. Should carbonization or coking occur on the bristle tips, the tips in effect would serve as cutting tools creating severe shaft scoring. With the present bristles having only a nominal stiffness, coking on the bristle tips is avoided. As a consequence of this arrangement, the oil mist from the bearing cavity is effectively sealed within the bearing cavity and without damage to the shaft.

Figure 3:
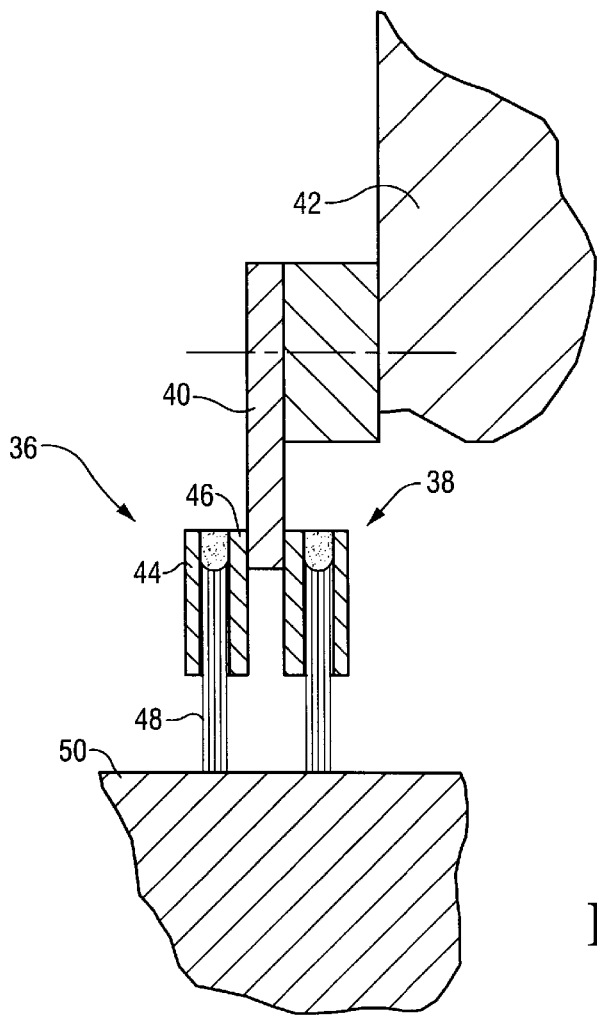
FIG. 3 is a cross-sectional view of a simplified seal employing a sheet metal mounting plate in accordance with the present invention.

Referring now to the embodiment hereof illustrated in FIG. 3, the prior art labyrinth seals are entirely replaced by a pair of brush seals 36 and 38. Moreover, the brush seal can be readily, easily and inexpensively secured to the fixed component. To accomplish the foregoing, the pair of brush seals are disposed on opposite sides of a sheet metal plate 40. The sheet metal plate may, for example, comprise a semi-annular plate which can be readily bolted to the fixed component 42. In this form, each of the brush seals is disposed similarly as the brush seal in FIG. 2. That is, a pair of backing plates 44 and 46 are provided on opposite sides of the bristle pack to secure the bristles. The bristles 48 project from the backing plates such that the tips engage the surface of the rotary component 50. Consequently, by forming the sheet metal plate 40 and the backing plates 44 and 46 in semi-circular configurations, the brush seal can be readily installed either as original equipment or as a retrofit for existing seals. As a retrofit, bolt holes can be formed in the fixed housing and the sheet metal plate 40 enabling the brush seal assembly to be readily bolted to the housing with the bristles in engagement with the rotary component.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. A rotary machine comprising:
   a rotatable component;
   a component fixed against rotation including a housing having a wall and a bearing in a bearing cavity on one side of the wall, the bearing cavity containing an oil mist generated by the rotation of the rotatable component in the bearing cavity;
   a seal between the rotatable component and housing wall for substantially sealing the oil mist in the bearing cavity from migration outwardly of the bearing cavity past the wall, said seal including a brush seal carried by said housing wall and having flexible bristles engaging said rotatable component and a backing plate for supporting said bristles;
   a sheet metal mounting plate carrying said backing plate for securement to said housing wall; and
   said bristles having a stiffness less than 1 psi/mil and a diameter in a range of 0.5 to 1.0 mils.

2. A rotary machine according to claim 1 including a second brush seal carried by said housing wall and axially spaced from the first mentioned brush seal.

3. A rotary machine according to claim 1 wherein said bristles are formed of a polymer material.

4. A rotary machine according to claim 1 wherein said bristles have a stiffness of about 0.2 psi/mil.

5. A rotary machine according to claim 1 wherein said bristles have a stiffness of about 0.2–0.4 psi/mil.

6. A rotary machine according to claim 1 wherein said bristles are formed of a polymer material and have a stiffness of about 0.2–0.4 psi/mil.

7. A rotary machine comprising:
   a rotatable component;
   a component fixed against rotation including a housing having a wall and a bearing in a bearing cavity on one side of the wall, the bearing cavity containing an oil mist generated by the rotation of the rotatable component in the bearing cavity;
   a seal between the rotatable component and housing wall for substantially sealing the oil mist in the bearing cavity from migration outwardly of the bearing cavity past the wall, said seal including a brush seal carried by said housing wall and having flexible bristles engaging said rotatable component and a backing plate for supporting said bristles;

a sheet metal mounting plate carrying said backing plate for securement to said housing wall;

a second brush seal carried by said housing wall and axially spaced from the first mentioned brush seal; and said brush seals being mounted on opposite sides of said sheet metal plate.

8. A rotary machine comprising:

a rotatable component;

a component fixed against rotation including a housing having a wall and a bearing in a bearing cavity on one side of the wall, the bearing cavity containing an oil mist generated by the rotation of the rotatable component in the bearing cavity;

a seal between the rotatable component and housing wall for substantially sealing the oil mist in the bearing cavity from migration outwardly of the bearing cavity past the wall, said seal including a brush seal carried by said housing wall and having flexible bristles engaging said rotatable component and a backing plate for supporting said bristles;

said bristles being formed of a polymer material and having a stiffness less than 1 psi/mil and a diameter in a range of 0.5 to 1.0 mils.

9. A rotary machine according to claim 8 wherein said bristles have a stiffness of about 0.2 psi/mil.

* * * * *